United States Patent
Dong

(10) Patent No.: US 12,464,410 B2
(45) Date of Patent: Nov. 4, 2025

(54) COMMUNICATION CONNECTION CONFIGURATION METHOD AND APPARATUS, AND COMMUNICATION DEVICE AND STORAGE MEDIUM

(71) Applicant: Beijing Xiaomi Mobile Software Co., Ltd., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 527 days.

(21) Appl. No.: 17/782,495

(22) PCT Filed: Dec. 6, 2019

(86) PCT No.: PCT/CN2019/123751
§ 371 (c)(1),
(2) Date: Jun. 3, 2022

(87) PCT Pub. No.: WO2021/109141
PCT Pub. Date: Jun. 10, 2021

(65) Prior Publication Data
US 2023/0028820 A1    Jan. 26, 2023

(51) Int. Cl.
*H04W 28/16* (2009.01)
(52) U.S. Cl.
CPC ................ *H04W 28/16* (2013.01)
(58) Field of Classification Search
CPC ..... H04W 28/16; H04W 72/51; H04W 76/10; H04W 72/0453; H04W 36/06
See application file for complete search history.

(56) References Cited

U.S. PATENT DOCUMENTS

| | | | | |
|---|---|---|---|---|
| 2009/0163223 A1* | 6/2009 | Casey | ............... | H04W 36/22 |
| | | | | 455/453 |
| 2012/0224612 A1* | 9/2012 | Kim | ............... | H04W 24/02 |
| | | | | 375/224 |
| 2019/0075469 A1* | 3/2019 | Mahoney | ............ | H04B 17/318 |
| 2019/0116545 A1* | 4/2019 | Verma | ............... | H04W 48/08 |
| 2019/0124542 A1* | 4/2019 | Pandey | ............. | H04W 28/0231 |
| 2019/0239226 A1* | 8/2019 | Chu | ................... | H04L 5/0037 |

(Continued)

FOREIGN PATENT DOCUMENTS

| CN | 102595635 A | 7/2012 |
|---|---|---|
| CN | 102625248 A | 8/2012 |

(Continued)

OTHER PUBLICATIONS

IEEE Computer Society. "IEEE Standard for Information Technology—Telecommunications and Information Exchange between Systems Local and Metropolitan Area Networks-Specific Requirements", IEEE Std 802.11, LAN/MAN Standards Committee of the IEEE Computer Society, Dec. 3, 2020, entire document, Type-A.

*Primary Examiner* — Brian D Nguyen
(74) *Attorney, Agent, or Firm* — Volpe Koenig

(57) ABSTRACT

A method for configuring communication connection, applied to a first communication device includes: receiving a first message frame, where the first message frame includes a first information element that indicates an operation bandwidth of a second communication device. The first message frame comprises receiving the first message frame through a first connection with the second communication device.

16 Claims, 5 Drawing Sheets

First communication device | Second communication device

101: Receive a first message frame, the first message frame including: a first information element that indicates an operation bandwidth of a second communication device 102: Establish N basic service sets (BSSs) based on the operation bandwidth of the second communication device and a maximum operation bandwidth supported by the first communication device, a first connection being configured on a first BSS in the N BSSs

(56) References Cited

U.S. PATENT DOCUMENTS

| | | | |
|---|---|---|---|
| 2019/0357053 A1 | 11/2019 | Kurian et al. | |
| 2020/0112961 A1* | 4/2020 | Gupta | H04W 24/02 |
| 2021/0075697 A1* | 3/2021 | Dattagupta | H04L 41/5019 |
| 2022/0095190 A1* | 3/2022 | Aio | H04W 36/30 |
| 2024/0365124 A1* | 10/2024 | Najmi | H04L 63/105 |

FOREIGN PATENT DOCUMENTS

| | | |
|---|---|---|
| CN | 105101304 A | 11/2015 |
| CN | 106664191 A | 5/2017 |
| GB | 0506916 | 5/2005 |
| WO | 2015018067 A1 | 2/2015 |
| WO | 2019/079197 A1 | 4/2019 |

* cited by examiner

| Order | Information | Notes |
|---|---|---|
| 24 | Operation bandwidth | Maximum bandwidth supported by STA |

| Order | Information | Notes |
|---|---|---|
| 18 | Operation bandwidth | Maximum bandwidth supported by STA |

| Order | Information | Notes |
|---|---|---|
| 68 | Maximum operation bandwidth | Maximum bandwidth supported by AP |

| Order | Information | Notes |
|---|---|---|
| 31 | Maximum operation bandwidth | Maximum bandwidth supported by AP |
Fig. 5b
| Order | Information | Notes |
|---|---|---|
| 18 | Maximum operation bandwidth | Maximum bandwidth supported by AP |
Fig. 5c
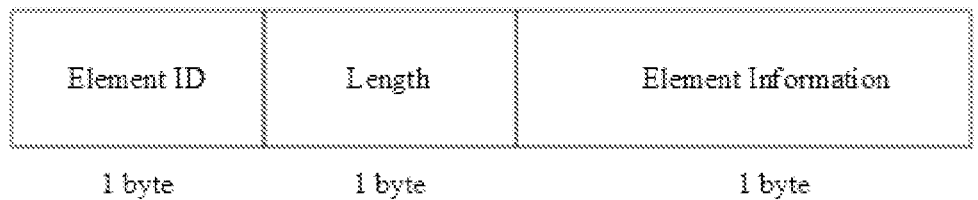
Fig. 6
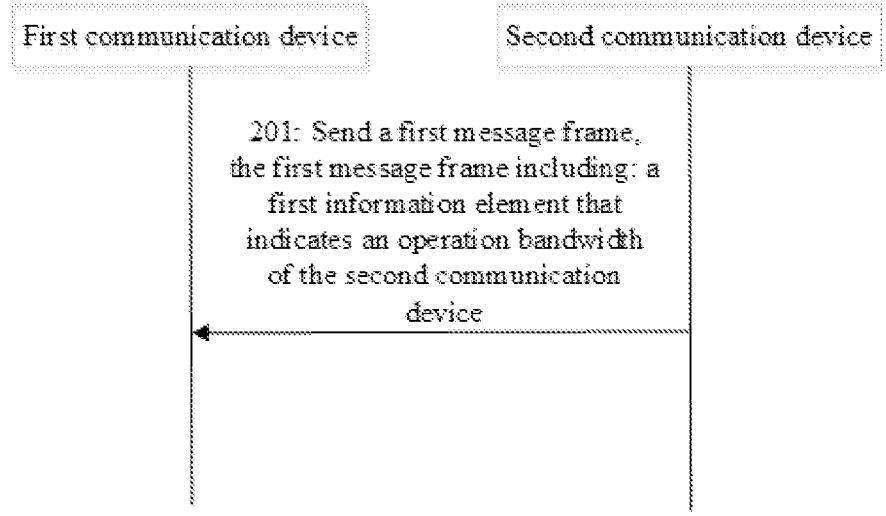
Fig. 7

COMMUNICATION CONNECTION CONFIGURATION METHOD AND APPARATUS, AND COMMUNICATION DEVICE AND STORAGE MEDIUM

CROSS REFERENCE TO RELATED APPLICATION

The present application is a U.S. National Stage of International Application No. PCT/CN2019/123751, filed on Dec. 6, 2019, the contents of all of which are incorporated herein by reference in their entireties for all purposes.

TECHNICAL FIELD

The present application relates to but is not limited to the technical field of wireless communication, in particular to a method and apparatus for configuring a communication connection, and a communication device and a storage medium.

BACKGROUND

The Institute of Electrical and Electronics Engineers established a study group (SG) to study the next-generation mainstream Wi-Fi technology. A research scope is: transmission with a bandwidth of 320 MHz, an aggregation and collaboration technology adopting a plurality of frequency bands, and a proposed vision to improve speed and throughput by at least four times compared with the existing IEEE802.11ax standard. Main application scenarios of the new technology are video transmission, augmented reality (AR), virtual reality (VR), etc.

In practical application of IEEE802.11be, a maximum operation bandwidth supported by an access point (AP) is 320 MHz, while a maximum operation bandwidth supported by a station (STA) is smaller than 320 MHz. For instance, the maximum bandwidth supported by the STA is 80 MHz or 160 MHz.

SUMMARY

Examples of the present disclosure provide a method for configuring a communication connection, and a communication device and a storage medium.

According to a first aspect of the present disclosure, a method for configuring a communication connection is provided. The method includes receiving a first message frame. The first message frame includes a first information element that indicates an operation bandwidth of a second communication device.

According to a second aspect of the present disclosure, a method for configuring a communication connection is provided and applied to a second communication device. The method includes sending a first message frame. The first message frame includes a first information element that indicates an operation bandwidth of the second communication device.

According to a third aspect of the present disclosure, a communication device is provided, and includes a processor, a transceiver, a memory and an executable program which is stored on the memory and can be run by the processor. The processor, when running the executable program, executes steps of the method for configuring a communication connection according to the first aspect or the second aspect.

It should be understood that the foregoing general description and the following detailed description are used as examples and are explanatory merely, without any limitation to the examples of the present disclosure.

BRIEF DESCRIPTION OF THE DRAWINGS

The accompanying drawings, which are incorporated in and constitute a part of this specification, illustrate examples consistent with the present disclosure, and together with the description serve to explain the principles of the examples of the present disclosure.

FIG. 2 is a schematic flow chart of a method for configuring a communication connection illustrated according to an example of the present disclosure.

FIG. 5b is a schematic diagram of another position of a second information element illustrated according to an example of the present disclosure.

FIG. 5c is a schematic diagram of yet another position of a second information element illustrated according to an example of the present disclosure.

FIG. 6 is a schematic structural diagram of an information element illustrated according to an example of the present disclosure.

FIG. 7 is a schematic flow chart of a method for configuring a communication connection illustrated according to an example of the present disclosure.

DETAILED DESCRIPTION

Examples will be described in detail herein, instances of which are illustrated in the accompanying drawings. When the following description refers to the accompanying drawings, the same numerals in different accompanying drawings refer to the same or similar elements unless otherwise indicated. The implementations described in the following examples do not represent all implementations consistent with examples of the present disclosure. Rather, they are merely instances of apparatus and methods consistent with some aspects of the examples of the disclosure as recited in the appended claims.

Terms used in the examples of the present disclosure are for the purpose of describing particular examples merely and are not intended to limit the examples of the present disclosure. Singular forms "a", "the", and "said" used in the examples of the present disclosure and the appended claims are intended to include plural forms as well, unless the context clearly dictates otherwise. It should also be understood that the term "and/or" used herein refers to and includes any and all possible combinations of one or more associated listed items.

It should be understood that although the terms first, second, third, etc. may be used in examples of the present disclosure to describe various information, and such information should not be limited to these terms. These terms are merely used to distinguish the same type of information from each other. For example, without departing from the scope of the examples of the present disclosure, first information may also be referred to as second information, and similarly, the second information may also be referred to as the first information. Depending on the context, the word "if" used herein can be interpreted as "upon" or "when" or "in response to determining".

Executive bodies involved in the examples of the present disclosure include but are not limited to: communication devices under wireless communication networks, especially Wi-Fi networks such as IEEE802.11a/b/g/n/ac standards, and next-generation Wi-Fi networks such as an IEEE802.11be standard. The communication devices include but are not limited to: Wi-Fi routers and other wireless access point (AP) devices, wireless stations (STAs), user terminals, user nodes, mobile terminals or tablet computers, etc.

An application scenario of the examples of the present disclosure is that in the related art, a maximum operation bandwidth supported by an AP is 320 MHz, while a maximum operation bandwidth supported by a STA is smaller than 320 MHz. For instance, the maximum operation bandwidth supported by the STA is 80 MHz or 160 MHz.

Figure 1A:
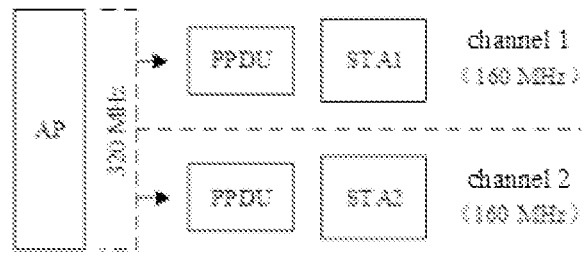
FIG. 1a is a schematic diagram of distribution of multi-connection communication channels in the related art illustrated according to an example of the present disclosure.
Figure 1B:
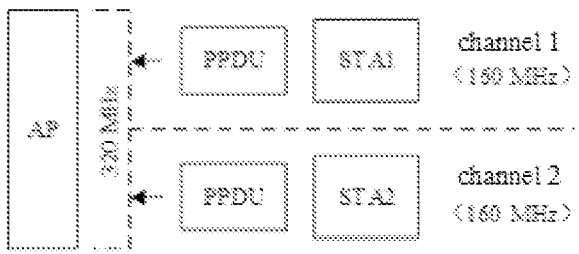
FIG. 1b is a schematic diagram of another distribution of multi-connection communication channels in the related art illustrated according to an example of the present disclosure.

Bandwidth asymmetry between the AP and the STA will lead to insufficient utilization of spectrum. In IEEE802.11be, multi-connection communication may be supported. FIG. 1*a* is a downlink, and FIG. 1*b* is an uplink. As shown in FIG. 1*a* and FIG. 1*b*: the 320 MHz bandwidth of the AP is divided into two channels, each with a bandwidth of 160 MHz. In response to determining that the maximum operation bandwidth supported by the AP is 320 MHz and the maximum operation bandwidth supported by the STA is 160 MHz, the AP can merely communicate with one site at the maximum bandwidth of 160 MHz at the same time, and the other operation bandwidth of 160 MHz cannot be used. There will also be a problem of unbalanced load between the two channels.

As shown in FIG. 2, an example provides a method for configuring a communication connection. The method may be applied to a first communication device in wireless communication and includes Step 101 where a first message frame is received. The first message frame includes: a first information element that indicates an operation bandwidth of a second communication device.

The first communication device may be a wireless access point (AP) in Wi-Fi wireless communication, and the second communication device may be a wireless station (STA) in Wi-Fi wireless communication.

The first message frame may be a management frame sent by the second communication device in a Wi-Fi communication technology. The second communication device may send the first message frame including the first information element in a process of associating or re-associating the first communication device. The second communication device may associate after link verification with the first communication device so as to gain access to a network. Association is a record keeping process that enables the first communication device to record the second communication device so as to send frames transmitted to a second communication device to the correct second communication device. A re-association process refers to a process of re-associating after the second communication device and the first communication device are disconnected from an association relationship.

For example, the first message frame may also be a data frame sent by the second communication device.

For example, the management frame sent by the second communication device may include: a probe request frame, an association request frame or an authentication request frame.

The second communication device may carry the first information element in the message frame to indicate the operation bandwidth of the wireless station. The operation bandwidth may be a current operation bandwidth of the second communication device or a maximum operation bandwidth that the wireless station may support.

Figure 3A:
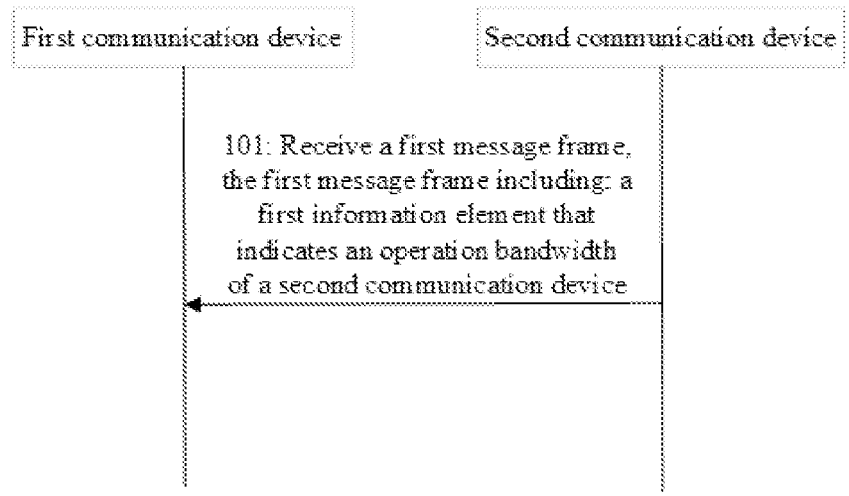
FIG. 3a is a schematic diagram of a position of a first information element illustrated according to an example of the present disclosure.
Figures 3B, 3C, 4, 5A:
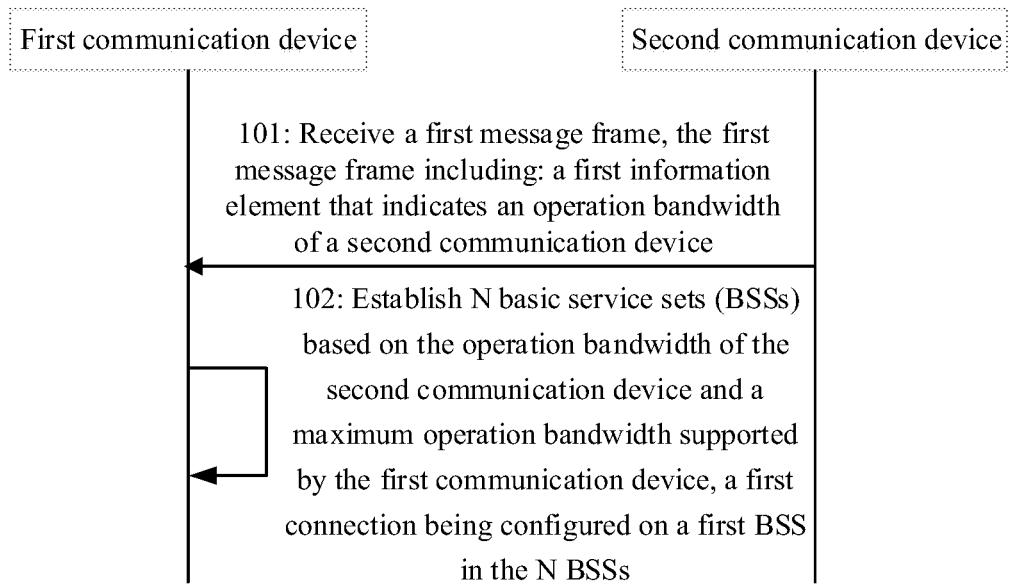
FIG. 3b is a schematic diagram of another position of a first information element illustrated according to an example of the present disclosure.
FIG. 3c is a schematic diagram of yet another location of a first information element illustrated according to an example of the present disclosure.
FIG. 4 is a schematic flow chart of another method for configuring a communication connection illustrated according to an example of the present disclosure.
FIG. 5a is a schematic diagram of a position of a second information element illustrated according to an example of the present disclosure.

The first information element may be set at a preset order position of a frame main body of the management frame of the second communication device. For example, as shown in FIG. 3*a*, the first information element may be set at a position of an order 20 of the probe request frame. As shown in FIG. 3*b*, the first information element may be set at a position of an order 24 of the association request frame. As shown in FIG. 3*c*, the first information element may be set at a position of an order 18 of the authentication request frame.

In this way, the second communication device provides a manner of explicitly indicating the operation bandwidth through the operation bandwidth of the second communication device indicated by the first information element in the message frame. The first communication device may directly determine the operation bandwidth of the second communication device according to the first information element included in the message frame, and no extra indication is needed for inquiring about the operation bandwidth of the second communication device. Thus, the amount of information included in the message frame is increased, and a convenience degree in acquiring the operation bandwidth of the second communication device is improved.

In one example, the receiving the first message frame includes: the first message frame is received through a first connection with the second communication device.

As shown in FIG. 4, the method for configuring a communication connection may further include step 102: N basic service sets (BSSs) are established based on the operation bandwidth of the second communication device and a maximum operation bandwidth supported by the first communication device, and the first connection is configured on a first BSS in the N BSSs. N is a positive integer.

The first connection is a current Wi-Fi connection between the first communication device and the second communication device. A basic service set (BSS) is a basic component of a Wi-Fi communication network and is used to describe a group of communication device that communicate with one another in the Wi-Fi network.

The N BSSs may be set within a scope of the maximum operation bandwidth supported by the first communication device. A bandwidth of each BSS may be set according to the operation bandwidth of the second communication device, so that each BSS may meet connection needs between the first communication device and the second communication device.

For example, the current operation bandwidth of the second communication device may be used as the bandwidth of each BSS. In this way, the first connection may be configured to the BSSs.

In one example, the method further includes: in response to determining that a load of the first BSS reaches a preset threshold, the first connection is migrated to a second BSS in the N BSSs. The second BSS is different from the first BSS.

Here, the load of the first BSS may include: the quantity of communication devices such as wireless stations borne by the first BSS and/or occupation condition of a bandwidth where the first BSS is located. The more wireless stations borne by the first BSS, the less resources allocated to each wireless station, so a communication efficiency of each wireless station is lowered. For example, the occupation condition of the bandwidth where the first BSS is located may be a proportion of time during each connection in the first BSS occupies the bandwidth where the first BSS is located. There may be a plurality of connections in the first BSS, and each connected wireless station may occupy the bandwidth where the first BSS is located through a time sharing manner. Under a circumstance that the quantity of connections of the first BSS is increased, a time proportion of bandwidth occupation by each single connection is relatively low, so it may be determined that less resources are allocated to the wireless stations in the connection.

The preset threshold may be set according to a need of a communication business of the second communication device for network connection. In response to determining that the load of the first BSS exceeds the preset threshold, i.e. a current network connection fails to meet the needs of the communication business of the second communication device, the first connection may be migrated to the second BSS.

The preset threshold may also be set according to load conditions of the BSSs. Under a circumstance that the load of the first BSS is increased, which causes unbalanced loads among the BSSs, the first connection may be migrated to the second BSS, so that the loads of the BSSs may be created in a balanced manner.

In this way, the first connection is migrated in response to determining that the load of the first BSS reaches the preset threshold. On the one hand, the load of the first BSS may be lowered, and communication quality may be improved. On the other hand, the loads of the BSSs may be balanced, and communication quality may be improved. Further, bandwidth resources occupied by the BSSs may be utilized, and a utilization rate of spectrum in the bandwidth of the first communication device is increased.

In one example, a bandwidth of one of the BSSs is equal to a product of the operation bandwidth of the second communication device and $2^{(M-1)}$, and the product of the operation bandwidth of the second communication device and $2^{(M-1)}$ is smaller than or equal to the maximum operation bandwidth supported by the first communication device, where M is a positive integer larger than or equal to 1.

The first communication device may compare its maximum operation bandwidth to the operation bandwidth of the second communication device. In response to determining that the maximum operation bandwidth of the first communication device is larger than the operation bandwidth of the second communication device, the product of the operation bandwidth of the second communication device and $2^{(M-1)}$ may be used as a bandwidth for establishing the BSSs. The N BSSs are established on the maximum operation bandwidth of the first communication device. The first connection may be a connection configured on the first BSS in the N BSSs.

The bandwidth of each BSS may be 1 time, 2 times, 4 times, etc., the operation bandwidth of the second communication device. For example, the operation bandwidth of the second communication device is 20 MHz, and the bandwidth of each BSS established by the first communication device may be 20 MHz, 40 MHz, 80 MHz or 160 MHz.

M may be determined by the first communication device according to a transmission environment. For example, under a circumstance that the quantity of devices connected to the first communication device is not large and the first communication device has bandwidth surplus, M may take a relatively large value, so that the bandwidths of the BSSs established may support relatively large bandwidths for data transmission.

In this way, the N BSSs established may meet the need of the first connection for bandwidth.

In one example, N is represented by the following expression (1):

$$N = \frac{B_{1max}}{2^{(M-1)}B_2} \quad (1)$$

where $B_{1\ max}$ represents the maximum operation bandwidth supported by the first communication device, and $B_2$ represents the operation bandwidth of the second communication device.

An operation bandwidth of an ordinary Wi-Fi device is one of 20 MHz, 40 MHz, 80 MHz, 160 MHz or 320 MHz. Under a circumstance that the maximum operation bandwidth of the first communication device is 320 MHz and the operation bandwidth of the second communication device is 20 MHz, the product of the operation bandwidth of the second communication device and $2^{(M-1)}$ is 20 MHz, 40 MHz, 80 MHz or 160 MHz. In this way, the first communication device may respectively establish 16, 8, 4 or 2 BSSs.

In one example, the operation bandwidth of the second communication device includes at least one of the following: an operation bandwidth currently used by the second communication device; and a maximum operation bandwidth supported by the second communication device.

The first communication device may use the operation bandwidth currently used by the second communication device or the maximum operation bandwidth supported by the second communication device as the bandwidth of the established BSSs. In this way, each BSS established may meet the needs of the second communication device for bandwidth.

In response to determining that the first message frame includes the first information element that indicates the operation bandwidth currently used by the second communication device, the first communication device may establish the plurality of BSSs by using the operation bandwidth currently used by the second communication device as the bandwidth of the established BSSs. In response to determining that the load of the first BSS where the second communication device is currently located reaches the preset threshold, the first communication device may migrate the first connection with the second communication device to the second BSS in the plurality of BSSs. A bandwidth of the second BSS is equal to the bandwidth of the first BSS, so data transmission of the first connection cannot be affected.

In response to determining that the first message frame includes the first information element that indicates the maximum operation bandwidth supported by the second communication device, the first communication device may establish the plurality of BSSs by using the maximum operation bandwidth supported by the second communication device as the bandwidth of the established BSSs. In response to determining that the load of the first BSS where the second communication device is currently located reaches the preset threshold, the first communication device may migrate the first connection with the second communication device to the second BSS in the plurality of BSSs. A bandwidth of the second BSS is equal to the bandwidth of the first BSS, so data transmission of the first connection cannot be affected. At the same time, because the bandwidth of the second BSS is the maximum operation bandwidth supported by the second communication device, which is larger than or equal to the operation bandwidth currently used by the second communication device, the second communication device may use a larger operation bandwidth in the second BSS to perform communication.

The first communication device may also provide an optimal operation bandwidth to establish the connection with the second communication device according to the maximum operation bandwidth supported by the second communication device.

In response to determining that the first message frame includes the first information element that indicates the operation bandwidth currently used by and the maximum operation bandwidth supported by the second communication device. The first communication device may select the operation bandwidth currently used by or the maximum operation bandwidth supported by the second communication device as the bandwidth of the established BSSs according to practical conditions. For example, in response to determining that the transmission environment cannot satisfy the second communication device's using the maximum operation bandwidth supported for transmission, the operation bandwidth currently used by the second communication device may be used as the bandwidth of the BSSs established.

In one example, the method further includes: a second message frame is sent. The second message frame includes a second information element that indicates the maximum operation bandwidth supported by the first communication device.

The second message frame may be a management frame sent by the first communication device in the Wi-Fi communication technology. The first communication device may send the second message frame including the second information element in a process of associating or re-associating the second communication device in response to the first message frame.

For example, the management frame sent by the first communication device may include: a probe response frame, a beacon frame, an association response frame or an authentication response frame.

The second message frame may be a response frame to the first message frame. A correspondence relationship between the first message frame and the second message frame may be shown in Table 1:

TABLE 1

| First message frame sent by STA | Second message frame sent by AP |
| --- | --- |
| Probe request frame | Probe response frame |
| Association request frame | Beacon frame |
|  | Association response frame |
| Authentication request frame | Authentication response frame |

The first communication device may carry the second information element in the second message frame to indicate the operation bandwidth supported by the wireless access point.

The second information element may be set at a preset order position of a frame main body of the management frame of the first communication device. For example, as shown in FIG. 5a, the second information element may be set at a position of an order 68 of the beacon frame. As shown in FIG. 5b, the second information element may be set at a position of an order 31 of the association response frame. As shown in FIG. 5c, the second information element may be set at a position of an order 18 of the authentication response frame.

In one example, the second information element includes: a second information element identifier, used to identify the second information element; a second length identifier, used to identify a length of the second information element; and a second operation bandwidth identifier, used to identify the maximum operation bandwidth supported by the first communication device.

A format of the second information element may be as shown in FIG. 6. For example, the transmission environment may occupy 3 bytes. The second information element identifier may occupy 1 byte, and the second information element identifier is used to identify the information element. The second length identifier may occupy 1 byte. The second operation bandwidth identifier occupies 1 byte and may use a binary number to represent the maximum operation bandwidth supported by the first communication device.

In one example, the first information element includes: a first information element identifier, used to identify the first information element; a first length identifier, used to identify a length of the first information element; and a first operation bandwidth identifier, used to identify the operation bandwidth currently used by the second communication device and/or the maximum operation bandwidth supported by the second communication device.

As shown in FIG. 6, for example, the first information element may adopt a format similar to that of the second information element. The first information element may occupy 3 bytes. The unit identifier may occupy 1 byte, and the first information element identifier is used to identify the information element. The first length identifier may occupy 1 byte. The first operation bandwidth identifier may occupy 1 byte and may adopt the operation bandwidth currently used by the second communication device and/or the maximum operation bandwidth supported by the second communication device.

The first operation bandwidth identifier may include two parts. A first part identifies the operation bandwidth currently used by the second communication device and may use three bits to represent one of 20 MHz, 40 MHz, 80 MHz, 160 MHz or 320 MHz. A second part identifies the maximum operation bandwidth supported by the second communication device and may use three bits to represent one of 20 MHz, 40 MHz, 80 MHz, 160 MHz or 320 MHz. The remaining two bits in the first operation bandwidth identifier may be used as preserved sites.

As shown in FIG. 7, an example provides a method for configuring a communication connection. The method may be applied to a second communication device in wireless communication and includes Step 201, a first message frame is sent. The first message frame includes: a first information element that indicates an operation bandwidth of the second communication device.

A first communication device may be a wireless access point (AP) in Wi-Fi wireless communication, and the second communication device may be a wireless station (STA) in Wi-Fi wireless communication.

The first message frame may be a management frame sent by the second communication device in a Wi-Fi communication technology. The second communication device may send the first message frame including the first information element in a process of associating or re-associating the first communication device. The second communication device may associate after link verification with the first communication device so as to gain access to a network. Association is a record keeping process that enables the first communication device to record the second communication device so as to send frames transmitted to a second communication device to the correct second communication device. A re-association process refers to a process of re-associating after the second communication device and the first communication device are disconnected from an association relationship.

For example, the first message frame may also be a data frame sent by the second communication device. For example, the management frame sent by the second communication device may include: a probe request frame, an association request frame or an authentication request frame.

The second communication device may carry the first information element in the message frame to indicate the operation bandwidth of the wireless station. The operation bandwidth may be a current operation bandwidth of the second communication device or a maximum operation bandwidth that the wireless station may support.

The first information element may be set at a preset order position of a frame main body of the management frame of the second communication device. For example, as shown in FIG. 3a, the first information element may be set at a position of an order 20 of the probe request frame. As shown in FIG. 3b, the first information element may be set at a position of an order 24 of the association request frame. As shown in FIG. 3c, the first information element may be set at a position of an order 18 of the authentication request frame.

In this way, the second communication device provides a manner of explicitly indicating the operation bandwidth through the operation bandwidth of the second communication device indicated by the first information element in the message frame. The first communication device may directly determine the operation bandwidth of the second communication device according to the first information element included in the message frame, and no extra indication is needed for inquiring about the operation bandwidth of the second communication device. Thus, the amount of information included in the message frame is increased, and a convenience degree in acquiring the operation bandwidth of the second communication device is improved.

In one example, the sending the first message frame includes: the first message frame is sent through a first connection with the first communication device. The first connection is configured on a first BSS in N basic service sets (BSSs). The N basic service sets (BSSs) are established by the first communication device based on the operation bandwidth of the second communication device and a maximum operation bandwidth supported by the first communication device. N is a positive integer.

The first connection is a current Wi-Fi connection between the first communication device and the second communication device. A basic service set (BSS) is a basic component of a Wi-Fi communication network and is used to describe a group of communication device that communicate with one another in the Wi-Fi network.

The N BSSs may be set within a scope of the maximum operation bandwidth supported by the first communication device. A bandwidth of each BSS may be set according to the operation bandwidth of the second communication device, so that each BSS may meet connection needs between the first communication device and the second communication device.

For example, the current operation bandwidth of the second communication device may be used as the bandwidth of each BSS. In this way, the first connection may be configured to the BSSs.

Figure 8:
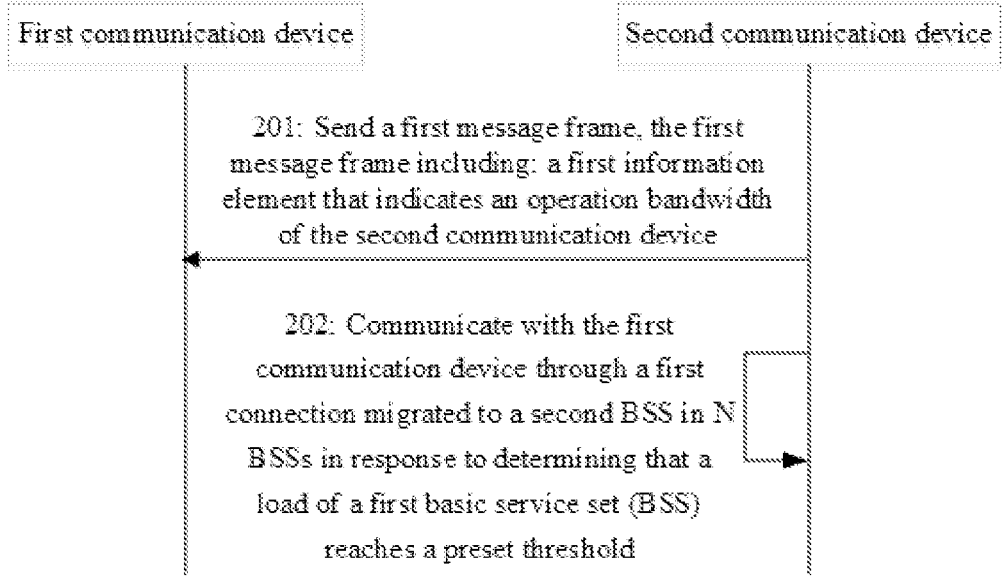
FIG. 8 is a schematic flow chart of another method for configuring a communication connection illustrated according to an example of the present disclosure.

In one example, as shown in FIG. 8, the method for configuring a communication connection may further include step 202: in response to determining that a load of the first BSS reaches a preset threshold, communication is performed with the first communication device through the first connection migrated to a second BSS in the N BSSs. The second BSS is different from the first BSS.

Here, the load of the first BSS may include: the quantity of communication devices such as wireless stations borne by the first BSS and/or occupation condition of a bandwidth where the first BSS is located. The more wireless stations borne by the first BSS, the less resources allocated to each wireless station, so a communication efficiency of each wireless station is lowered. For example, the occupation condition of the bandwidth where the first BSS is located may be a proportion of time during each connection in the first BSS occupies the bandwidth where the first BSS is located. There may be a plurality of connections in the first BSS, and each connected wireless station may occupy the bandwidth where the first BSS is located through a time sharing manner. Under a circumstance that the quantity of connections of the first BSS is increased, a time proportion of bandwidth occupation by each single connection is relatively low, so it may be determined that less resources are allocated to the wireless stations in the connection.

The preset threshold may be set according to a need of a communication business of the second communication device for network connection. In response to determining that the load of the first BSS exceeds the preset threshold, i.e. a current network connection fails to meet the needs of the communication business of the second communication device, the first connection may be migrated to the second BSS.

The preset threshold may also be set according to load conditions of the BSSs. Under a circumstance that the load of the first BSS is increased, which causes unbalanced loads among the BSSs, the first connection may be migrated to the second BSS, so that the loads of the BSSs may be created in a balanced manner.

In this way, the first connection is migrated in response to determining that the load of the first BSS reaches the preset threshold. On the one hand, the load of the first BSS may be lowered, and communication quality may be improved. On the other hand, the loads of the BSSs may be balanced, and communication quality may be improved. Further, bandwidth resources occupied by the BSSs may be utilized, and a utilization rate of spectrum in the bandwidth of the first communication device is increased.

In one example, a bandwidth of one of the BSSs is equal to a product of the operation bandwidth of the second communication device and $2^{(M-1)}$, and the product of the operation bandwidth of the second communication device and $2^{(M-1)}$ is smaller than or equal to the maximum operation bandwidth supported by the first communication device, where M is a positive integer larger than or equal to 1.

The first communication device may compare its maximum operation bandwidth to the operation bandwidth of the second communication device. In response to determining that the maximum operation bandwidth of the first communication device is larger than the operation bandwidth of the second communication device, the product of the operation bandwidth of the second communication device and $2^{(M-1)}$ may be used as a bandwidth for establishing the BSSs. The N BSSs are established on the maximum operation bandwidth of the first communication device. The first connection may be a connection configured on the first BSS in the N BSSs.

The bandwidth of each BSS may be 1 time, 2 times, 4 times, etc., the operation bandwidth of the second communication device. For example, the operation bandwidth of the second communication device is 20 MHz, and the bandwidth of each BSS established by the first communication device may be 20 MHz, 40 MHz, 80 MHz or 160 MHz.

M may be determined by the first communication device according to a transmission environment. For example, under a circumstance that the quantity of devices connected to the first communication device is not large and the first communication device has bandwidth surplus, M may take a relatively large value, so that the bandwidths of the BSSs established may support relatively large bandwidths for data transmission. In this way, the N BSSs established may meet the need of the first connection for bandwidth.

In one example, N may be represented by an expression (1). $B_{1\ max}$ represents the maximum operation bandwidth supported by the first communication device, and $B_2$ represents the operation bandwidth of the second communication device.

An operation bandwidth of an ordinary Wi-Fi device is one of 20 MHz, 40 MHz, 80 MHz, 160 MHz or 320 MHz. Under a circumstance that the maximum operation bandwidth of the first communication device is 320 MHz and the operation bandwidth of the second communication device is 20 MHz, the product of the operation bandwidth of the second communication device and $2^{(M-1)}$ is 20 MHz, 40 MHz, 80 MHz or 160 MHz. In this way, the first communication device may respectively establish 16, 8, 4 or 2 BSSs.

In one example, the operation bandwidth of the second communication device includes at least one of the following: an operation bandwidth currently used by the second communication device; and a maximum operation bandwidth supported by the second communication device.

The first communication device may use the operation bandwidth currently used by the second communication device or the maximum operation bandwidth supported by the second communication device as the bandwidth of the established BSSs. In this way, each BSS established may meet the needs of the second communication device for bandwidth.

In response to determining that the first message frame includes the first information element that indicates the operation bandwidth currently used by the second communication device, the first communication device may establish the plurality of BSSs by using the operation bandwidth currently used by the second communication device as the bandwidth of the established BSSs. In response to determining that the load of the first BSS where the second communication device is currently located reaches the preset threshold, the first communication device may migrate the first connection with the second communication device to the second BSS in the plurality of BSSs. A bandwidth of the second BSS is equal to the bandwidth of the first BSS, so data transmission of the first connection cannot be affected.

In response to determining that the first message frame includes the first information element that indicates the maximum operation bandwidth supported by the second communication device, the first communication device may establish the plurality of BSSs by using the maximum operation bandwidth supported by the second communication device as the bandwidth of the established BSSs. In response to determining that the load of the first BSS where the second communication device is currently located reaches the preset threshold, the first communication device may migrate the first connection with the second communication device to the second BSS in the plurality of BSSs. A bandwidth of the second BSS is equal to the bandwidth of the first BSS, so data transmission of the first connection cannot be affected. At the same time, because the bandwidth of the second BSS is the maximum operation bandwidth supported by the second communication device, which is larger than or equal to the operation bandwidth currently used by the second communication device, the second communication device may use a larger operation bandwidth in the second BSS to perform communication.

The first communication device may also provide an optimal operation bandwidth to establish the connection with the second communication device according to the maximum operation bandwidth supported by the second communication device.

In response to determining that the first message frame includes the first information element that indicates the operation bandwidth currently used by and the maximum operation bandwidth supported by the second communication device, the first communication device may select the operation bandwidth currently used by or the maximum operation bandwidth supported by the second communication device as the bandwidth of the established BSSs according to practical conditions. For example, in response to determining that the transmission environment cannot satisfy the second communication device's using the maximum operation bandwidth supported for transmission, the operation bandwidth currently used by the second communication device may be used as the bandwidth of the BSSs established.

In one example, the method further includes: a second message frame is sent. The second message frame includes a second information element that indicates the maximum operation bandwidth supported by the first communication device.

The second message frame may be a management frame sent by the first communication device in the Wi-Fi communication technology. The first communication device may send the second message frame including the second information element in a process of associating or re-associating the second communication device in response to the first message frame.

For example, the management frame sent by the first communication device may include: a probe response frame, a beacon frame, an association response frame or an authentication response frame.

The second message frame may be a response frame of the first message frame. A correspondence relationship between the first message frame and the second message frame may be as shown in Table 1.

The first communication device may carry the second information element in the second message frame to indicate the operation bandwidth supported by the wireless access point.

The second information element may be set at a preset order position of a frame main body of the management frame of the first communication device. For example, as shown in FIG. 5a, the second information element may be set at a position of an order 68 of the beacon frame. As shown in FIG. 5b, the second information element may be set at a position of an order 31 of the association response frame. As shown in FIG. 5c, the second information element may be set at a position of an order 18 of the authentication response frame.

In one example, the second information element includes: a second information element identifier, used to identify the second information element; a second length identifier, used to identify a length of the second information element; and a second operation bandwidth identifier, used to identify the maximum operation bandwidth supported by the first communication device.

A format of the second information element may be as shown in FIG. 5. For example, the transmission environment may occupy 3 bytes. The second information element identifier may occupy 1 byte, and the second information element identifier is used to identify the information element. The second length identifier may occupy 1 byte. The second operation bandwidth identifier occupies 1 byte and may use a binary number to represent the maximum operation bandwidth supported by the first communication device.

In one example, the first information element includes: a first information element identifier, used to identify the first information element; a first length identifier, used to identify a length of the first information element; and a first operation bandwidth identifier, used to identify the operation bandwidth currently used by the second communication device and/or the maximum operation bandwidth supported by the second communication device.

As shown in FIG. 5, for example, the first information element may adopt a format similar to that of the second information element. The first information element may occupy 3 bytes. The unit identifier may occupy 1 byte, and the first information element identifier is used to identify the information element. The first length identifier may occupy 1 byte. The first operation bandwidth identifier may occupy 1 byte and may adopt the operation bandwidth currently used by the second communication device and/or the maximum operation bandwidth supported by the second communication device.

The first operation bandwidth identifier may include two parts. A first part identifies the operation bandwidth currently used by the second communication device and may use three bits to represent one of 20 MHz, 40 MHz, 80 MHz, 160 MHz or 320 MHz. A second part identifies the maximum operation bandwidth supported by the second communication device and may use three bits to represent one of 20 MHz, 40 MHz, 80 MHz, 160 MHz or 320 MHz. The remaining two bits in the first operation bandwidth identifier may be used as preserved sites.

A specific instance is provided below in combination with any of the above examples:

1. Indication of maximum operation bandwidth support.

a. In a process of initial connection between the wireless station and the wireless access point, both the wireless station and the wireless access point may carry indication information on the maximum operation bandwidth supported by them in an initial connection message frame. In particular wireless access point: the maximum operation bandwidth supported by the wireless access point may be carried by the probe response frame, the beacon frame, the association response frame or the authentication response frame. Specifically, the maximum operation bandwidth supported by the wireless access point may be carried on a frame body part.

For example, the maximum operation bandwidth supported by the wireless access point may be carried at the position of the order 68 of the beacon frame shown in FIG. 5a, the position of the order 31 of the association response frame shown in FIG. 5b, or the position of the order 18 of the authentication response frame in FIG. 5c.

Wireless station: the maximum operation bandwidth supported by the wireless station may be carried on the probe request frame, the association request frame or the authentication request frame. Specifically, the maximum operation bandwidth supported by the wireless station may be carried on a frame body part.

For example, the maximum operation bandwidth supported by the wireless station may be carried at the position of the order 20 of the probe request frame shown in FIG. 3a, the position of the order 24 of the association request frame shown in FIG. 3b, or the position of the order 18 of the authentication request frame in FIG. 3c.

b. Format of information element supporting the maximum operation bandwidth.

The wireless station and the wireless access point may adopt similar information element formats to indicate the maximum operation bandwidth. Specific formats are shown in FIG. 6. An element identifier (element ID) defines a new type of information element, a length identifier identifies a length of the information element, and element information may be divided into two parts. A first part is: a currently working channel bandwidth, where three bits are used to identify 20/40/80/160/160+80/160+160/320 MHz; and a second part is: the maximum operation bandwidth supported, where three bits are also used to identify 20/40/80/160/160+80/160+160/320 MHz, and the remaining two bits are preserved sites.

2. Specific implementation of the wireless station and the wireless access point respectively send the message frames carrying the above information elements in an initial access process. After receiving the beacon frame sent by the wireless access point, the wireless station parses the information element on the maximum operation bandwidth supported by the wireless access point and sends the authentication request frame. A current bandwidth of the wireless station set in the authentication request frame is normally 20 MHz or larger. After receiving the authentication request frame sent by the wireless station, the wireless access point obtains the maximum operation bandwidth supported by the wireless station through parsing. Under a circumstance that the maximum operation bandwidth supported by the wireless station is smaller than the maximum operation bandwidth supported by the wireless access point, the wireless access point may migrate the wireless station to which an initial connection has been established during data communication to another BSS for data communication according to load conditions of the BSSs established.

For example: the wireless station and the wireless access point establish the initial connection under a bandwidth of 20 MHz, the maximum operation bandwidth supported by the wireless station is 20 MHz and the maximum operation bandwidth supported by the wireless access point is 80 MHz; and then the wireless access point may establish 4 BSSs and may migrate the wireless station to any BSS established (except the BSS where the initial connection is established) for data communication based on the load condition of each BSS. The wireless access point may determine the quantity of the BSSs established according to the current channel bandwidth where the wireless station establishes the initial connection. In particular: the quantity of the BSSs is the quotient of the maximum operation bandwidth supported by the wireless access point divided by the current operation bandwidth of the wireless station; or the quantity of the BSSs is the quotient of the maximum operation bandwidth supported by the wireless access point divided by twice the current operation bandwidth of the wireless station; or the quantity of the BSSs is the quotient of the maximum operation bandwidth supported by four times the wireless access point divided by the current operation bandwidth of the wireless station. The quantity of the BSSs established is determined according to the current operation bandwidth of the wireless station and the maximum operation bandwidth of the wireless access point.

Figure 9:
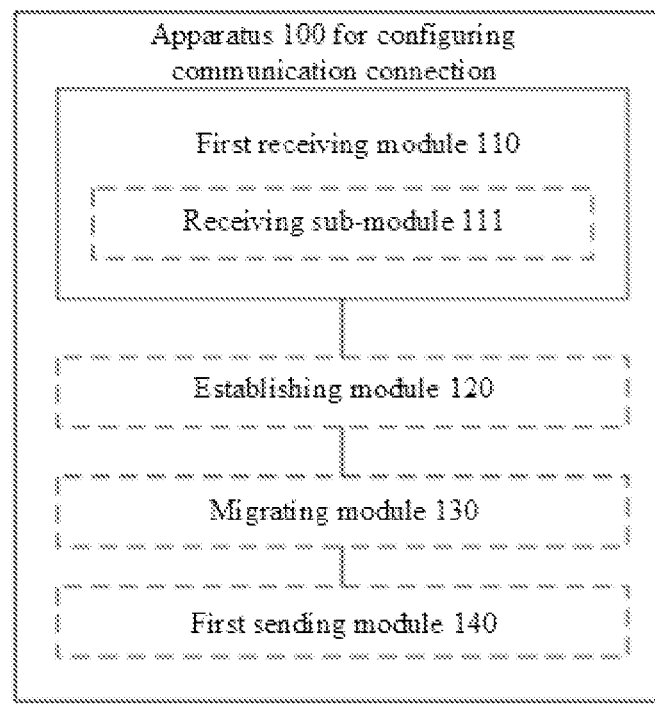
FIG. 9 is a structural block diagram of composition of an apparatus for configuring a communication connection illustrated according to an example of the present disclosure.

An example of the present disclosure further provides an apparatus for configuring a communication connection, applied to a first communication device in wireless communication. FIG. 9 is a structural block diagram of composition of an apparatus 100 for configuring a communication connection illustrated according to an example. As shown in FIG. 9, the apparatus 100 includes: a first receiving module 110.

The first receiving module 110 is configured to receive a first message frame. The first message frame includes: a first information element that indicates an operation bandwidth of a second communication device.

In one example, the first receiving module 110 includes a receiving sub-module 111, configured to receive the first message frame through a first connection with the second communication device.

The apparatus 100 further includes an establishing module 120, configured to establish N basic service sets (BSSs) based on the operation bandwidth of the second communication device and a maximum operation bandwidth supported by the first communication device. The first connection is configured on a first BSS in the N BSSs. N is a positive integer.

In one example, the apparatus 100 further includes a migrating module 130, configured to migrate, in response to determining that a load of the first BSS reaches a preset threshold, the first connection to a second BSS in the N BSSs. The second BSS is different from the first BSS.

In one example, a bandwidth of one of the BSSs is equal to a product of the operation bandwidth of the second communication device and $2^{(M-1)}$, and the product of the operation bandwidth of the second communication device and $2^{(M-1)}$ is smaller than or equal to the maximum operation bandwidth supported by the first communication device, where M is a positive integer larger than or equal to 1.

In one example, N is represented by the following expression:

$$N = \frac{B_{1max}}{2^{(M-1)}B_2}$$

where $B_{1\ max}$ represents the maximum operation bandwidth supported by the first communication device, and $B_2$ represents the operation bandwidth of the second communication device.

In one example, the operation bandwidth of the second communication device includes at least one of the following: an operation bandwidth currently used by the second communication device; and a maximum operation bandwidth supported by the second communication device.

In one example, the apparatus 100 further includes a first sending module 140, configured to send a second message frame. The second message frame includes a second information element that indicates the maximum operation bandwidth supported by the first communication device.

In one example, the second information element includes: a second information element identifier, used to identify the second information element; a second length identifier, used to identify a length of the second information element; and a second operation bandwidth identifier, used to identify the maximum operation bandwidth supported by the first communication device.

In one example, the first information element includes: a first information element identifier, used to identify the first information element; a first length identifier, used to identify a length of the first information element; and a first operation bandwidth identifier, used to identify the operation bandwidth currently used by the second communication device and/or the maximum operation bandwidth supported by the second communication device.

Figure 10:
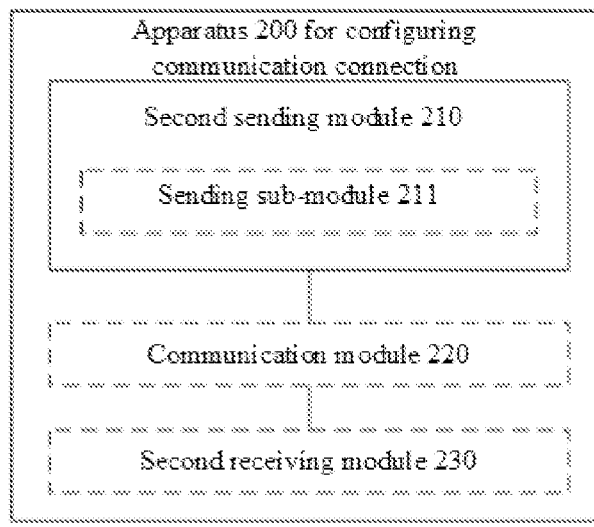
FIG. 10 is a structural block diagram of composition of another apparatus for configuring a communication connection illustrated according to an example of the present disclosure.

An example of the present disclosure further provides an apparatus for configuring a communication connection, applied to a second communication device in wireless communication. FIG. 10 is a structural block diagram of composition of an apparatus 200 for configuring a communication connection illustrated according to an example. As shown in FIG. 10, the apparatus 200 includes: a second sending module 210.

The second sending module 210 is configured to send a first message frame. The first message frame includes: a first information element that indicates an operation bandwidth of the second communication device.

In one example, the second sending module 210 includes a sending sub-module 211, configured to send the first message frame through a first connection with a first communication device.

The first connection is configured on a first BSS in N basic service sets (BSSs). The N basic service sets (BSSs) are established by the first communication device based on the operation bandwidth of the second communication device and a maximum operation bandwidth supported by the first communication device. N is a positive integer.

In one example, the apparatus 200 further includes a communication module 220, configured to: in response to determining that a load of the first BSS reaches a preset threshold, communicate with the first communication device through the first connection migrated to a second BSS in the N BSSs. The second BSS is different from the first BSS.

In one example, a bandwidth of one of the BSSs is equal to a product of the operation bandwidth of the second communication device and $2^{(M-1)}$, and the product of the operation bandwidth of the second communication device and $2^{(M-1)}$ is smaller than or equal to the maximum operation bandwidth supported by the first communication device, where M is a positive integer larger than or equal to 1.

In one example, N is represented by the following expression:

$$N = \frac{B_{1max}}{2^{(M-1)}B_2}$$

where $B_{1\ max}$ represents the maximum operation bandwidth supported by the first communication device, and $B_2$ represents the operation bandwidth of the second communication device.

In one example, the operation bandwidth of the second communication device includes at least one of the following: an operation bandwidth currently used by the second communication device; and a maximum operation bandwidth supported by the second communication device.

In one example, the apparatus 200 further includes: a second receiving module 230, configured to receive a second message frame. The maximum operation bandwidth supported by the first communication device is determined according to a second information element included by the second message frame.

In one example, the second information element includes: a second information element identifier, used to identify the second information element; a second length identifier, used to identify a length of the second information element; and a second operation bandwidth identifier, used to identify the maximum operation bandwidth supported by the first communication device.

In one example, the first information element includes: a first information element identifier, used to identify the first information element; a first length identifier, used to identify a length of the first information element; and a first operation bandwidth identifier, used to identify the operation bandwidth currently used by the second communication device and/or the maximum operation bandwidth supported by the second communication device.

In an example, the first receiving module 110, the establishing module 120, the migrating module 130, the first sending module 140, the second sending module 210, the communication module 220 and the second receiving module 230 may be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors, or other electronic component to execute the aforementioned method.

Figure 11:
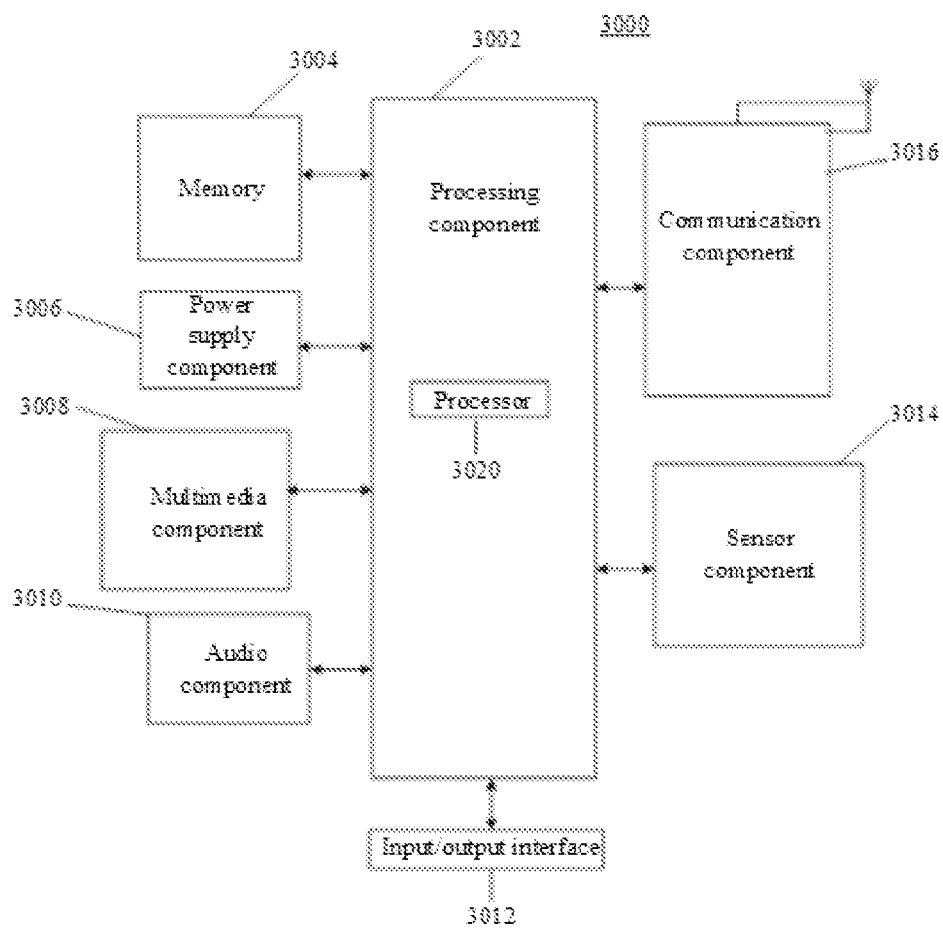
FIG. 11 is a block diagram of an apparatus for a communication connection configuration illustrated according to an example of the present disclosure.

FIG. 11 is a block diagram of an apparatus 3000 for a communication connection configuration or for determining transmission block configuration parameters illustrated according to an example. For instance, the apparatus 3000 may be a mobile phone, a computer, a digital broadcasting electronic device, a messaging device, a game console, a tablet device, a medical device, a fitness device, a personal digital assistant, etc.

With reference to FIG. 11, the apparatus 3000 may include one or more of the following components: a processing component 3002, a memory 3004, a power supply component 3006, a multimedia component 3008, an audio component 3010, an input/output (I/O) interface 3012, a sensor component 3014, and a communication component 3016.

The processing component 3002 generally controls overall operations of the apparatus 3000, such as operations associated with display, telephone calls, data communication, camera operations, and recording operations. The processing component 3002 may include one or a plurality of processors 3020 to execute instructions to complete all or part of the steps of the above method. In addition, the processing component 3002 may include one or a plurality of modules to facilitate interaction between the processing component 3002 and other components. For instance, the processing component 3002 may include a multimedia module to facilitate interaction between the multimedia component 3008 and the processing component 3002.

The memory 3004 is configured to store various types of data to support operations on the apparatus 3000. Instances of these data include instructions for any application program or method operating on the apparatus 3000, contact data, phone book data, messages, pictures, videos, etc. The memory 3004 may be implemented by any type of volatile or non-volatile storage devices or their combination, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 3006 provides power to various components of the apparatus 3000. The power supply component 3006 may include a power management system, one or a plurality of power supplies, and other components associated with generation, management, and distribution of the power for the apparatus 3000.

The multimedia component 3008 includes a screen that provides an output interface between the apparatus 3000 and a user. In some examples, the screen may include a liquid crystal display (LCD) and a touch panel (TP). If the screen includes the touch panel, the screen may be implemented as a touch screen to receive input signals from the user. The touch panel includes one or a plurality of touch sensors to sense touch, wipe, and gestures on the touch panel. The touch sensor may not only sense a boundary of a touch or wipe action, but also detect a duration and pressure related to a touch or wipe operation. In some examples, the multimedia component 3008 includes a front camera and/or a rear camera. When the apparatus 3000 is in an operation mode, such as a shooting mode or a video mode, the front camera and/or the rear camera may receive external multimedia data. Each front camera and rear camera may be a fixed optical lens system or have focal length and optical zoom capabilities.

The audio component 3010 is configured to output and/or input audio signals. For instance, the audio component 3010 includes a microphone (MIC). When the apparatus 3000 is in the operation mode, such as a call mode, a recording mode, and a voice recognition mode, the microphone is configured to receive external audio signals. The received audio signals may be further stored in the memory 3004 or sent via the communication component 3016. In some examples, the audio component 3010 further includes a speaker for outputting audio signals.

The I/O interface 3012 provides an interface between the processing component 3002 and a peripheral interface module. The above peripheral interface module may be a keyboard, a click wheel, buttons, etc. These buttons may include but are not limited to: a home button, a volume button, a start button, and a lock button.

The sensor component 3014 includes one or a plurality of sensors to provide the apparatus 3000 with various aspects of status assessment. For instance, the sensor component 3014 may detect an on/off status of the apparatus 3000 and relative positioning of a component. For instance, the component is a display and a keypad of the apparatus 3000. The sensor component 3014 may also detect a position change of the apparatus 3000 or a component of the apparatus 3000, presence or absence of contact between the user and the apparatus 3000, orientation or acceleration/deceleration of the apparatus 3000, and a temperature change of the apparatus 3000. The sensor component 3014 may include a proximity sensor configured to detect presence of a nearby object when there is no physical contact. The sensor component 3014 may further include a light sensor, such as a CMOS or CCD image sensor, for use in an imaging application. In some examples, the sensor component 3014 may further include an acceleration sensor, a gyroscope sensor, a magnetic sensor, a pressure sensor or a temperature sensor.

The communication component 3016 is configured to facilitate wired or wireless communication between the apparatus 3000 and other devices. The apparatus 3000 may access a wireless network based on a communication standard, such as Wi-Fi, 2G or 3G, or a combination of Wi-Fi, 2G and 3G. In an example, the communication component 3016 receives a broadcast signal or broadcast related information from an external broadcast management system via a broadcast channel. In an example, the communication component 3016 further includes a near field communication (NFC) module to facilitate short-range communication. For instance, the NFC module may be implemented based on a radio frequency identification (RFID) technology, an infrared data association (IrDA) technology, an ultra-wideband (UWB) technology, a Bluetooth (BT) technology and other technologies.

In an example, the apparatus 3000 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic elements, so as to execute the above method.

In an example, a non-transitory computer-readable storage medium including instructions is further provided, for instance, a memory 3004 including the instructions. The above instructions may be executed by a processor 3020 of an apparatus 3000 to complete the above method. For instance, the non-transitory computer-readable storage medium may be a ROM, a random-access memory (RAM), a CD-ROM, a magnetic tape, a floppy disk, an optical data storage device, etc.

After considering the specification and practicing the present disclosure disclosed herein, those of skill in the art will easily think of other examples of the present disclosure. The present application is intended to cover any variations, uses, or adaptive changes of the present disclosure. These variations, uses, or adaptive changes follow the general principles of the examples of the present disclosure and include common knowledge or conventional technical means in the technical field that are not disclosed in the examples of the present disclosure.

It should be understood that the examples of the present disclosure are not limited to the precise structure that has been described above and shown in the drawings, and various modifications and changes can be made without departing from its scope.

According to a first aspect of examples of the present disclosure, a method for configuring a communication connection is provided. The method includes:
receiving a first message frame. The first message frame includes: a first information element that indicates an operation bandwidth of a second communication device.

In one example, the receiving the first message frame includes:
receiving the first message frame through a first connection with the second communication device.
The method further includes:
establishing N basic service sets (BSSs) based on the operation bandwidth of the second communication device and a maximum operation bandwidth supported by the first communication device. The first connection is configured on a first BSS in the N BSSs.
N is a positive integer.

In one example, the method further includes:
Migrating, in response to determining that a load of the first BSS reaches a preset threshold, the first connection to a second BSS in the N BSSs.
The second BSS is different from the first BSS.

In one example, a bandwidth of one of the BSSs is equal to a product of the operation bandwidth of the second communication device and $2^{(M-1)}$, and the product of the operation bandwidth of the second communication device and $2^{(M-1)}$ is smaller than or equal to the maximum operation bandwidth supported by the first communication device, where M is a positive integer larger than or equal to 1.

In one example, N is represented by the following expression:

$$N = \frac{B_{1max}}{2^{(M-1)}B_2}$$

where $B_{1\ max}$ represents the maximum operation bandwidth supported by the first communication device, and $B_2$ represents the operation bandwidth of the second communication device.

In one example, the operation bandwidth of the second communication device includes at least one of the following:
an operation bandwidth currently used by the second communication device; and
a maximum operation bandwidth supported by the second communication device.

In one example, the method further includes:
sending a second message frame. The second message frame includes a second information element that indicates the maximum operation bandwidth supported by the first communication device.

In one example, the second information element includes:
a second information element identifier for identifying the second information element;
a second length identifier for identifying a length of the second information element; and
a second operation bandwidth identifier for identifying the maximum operation bandwidth supported by the first communication device.

In one example, the first information element includes:
a first information element identifier for identifying the first information element;

a first length identifier for identifying a length of the first information element; and a first operation bandwidth identifier for identifying the operation bandwidth currently used by the second communication device and/or the maximum operation bandwidth supported by the second communication device.

According to a second aspect of examples of the present disclosure, a method for configuring a communication connection is provided and applied to a second communication device. The method includes:

sending a first message frame. The first message frame includes: a first information element that indicates an operation bandwidth of the second communication device.

In one example, the sending the first message frame includes:

sending the first message frame through a first connection with a first communication device.

The first connection is configured on a first BSS in N basic service sets (BSSs). The N basic service sets (BSSs) are established by the first communication device based on the operation bandwidth of the second communication device and a maximum operation bandwidth supported by the first communication device.

N is a positive integer.

In one example, the method further includes:

in response to determining that a load of the first BSS reaches a preset threshold, communicating with the first communication device through the first connection migrated to a second BSS in the N BSSs.

The second BSS is different from the first BSS.

In one example, a bandwidth of one of the BSSs is equal to a product of the operation bandwidth of the second communication device and $2^{(M-1)}$, and the product of the operation bandwidth of the second communication device and $2^{(M-1)}$ is smaller than or equal to the maximum operation bandwidth supported by the first communication device, where M is a positive integer larger than or equal to 1.

In one example, N is represented by the following expression:

$$N = \frac{B_{1max}}{2^{(M-1)}B_2}$$

where $B_{1\ max}$ represents the maximum operation bandwidth supported by the first communication device, and $B_2$ represents the operation bandwidth of the second communication device.

In one example, the operation bandwidth of the second communication device includes at least one of the following:

an operation bandwidth currently used by the second communication device; and a maximum operation bandwidth supported by the second communication device.

In one example, the method further includes:

receiving a second message frame. The maximum operation bandwidth supported by the first communication device is determined according to a second information element included by the second message frame.

In one example, the second information element includes:

a second information element identifier for identifying the second information element;

a second length identifier for identifying a length of the second information element; and a second operation bandwidth identifier for identifying the maximum operation bandwidth supported by the first communication device.

In one example, the first information element includes:

a first information element identifier for identifying the first information element;

a first length identifier for identifying a length of the first information element; and a first operation bandwidth identifier for identifying the operation bandwidth currently used by the second communication device and/or the maximum operation bandwidth supported by the second communication device.

According to a third aspect of examples of the present disclosure, an apparatus for configuring a communication connection is provided and applied to a first communication device. The apparatus includes: a first receiving module.

The first receiving module is configured to receive a first message frame. The first message frame includes: a first information element that indicates an operation bandwidth of a second communication device.

In one example, the first receiving module includes:

a receiving sub-module, configured to receive the first message frame through a first connection with the second communication device.

The apparatus further includes:

an establishing module, configured to establish N basic service sets (BSSs) based on the operation bandwidth of the second communication device and a maximum operation bandwidth supported by the first communication device. The first connection is configured on a first BSS in the N BSSs.

N is a positive integer.

In one example, the apparatus further includes:

a migrating module, configured to migrate, in response to determining that a load of the first BSS reaches a preset threshold, the first connection to a second BSS in the N BSSs.

The second BSS is different from the first BSS.

In one example, a bandwidth of one of the BSSs is equal to a product of the operation bandwidth of the second communication device and $2^{(M-1)}$, and the product of the operation bandwidth of the second communication device and $2^{(M-1)}$ is smaller than or equal to the maximum operation bandwidth supported by the first communication device, where M is a positive integer larger than or equal to 1.

In one example, N is represented by the following expression:

$$N = \frac{B_{1max}}{2^{(M-1)}B_2}$$

where $B_{1\ max}$ represents the maximum operation bandwidth supported by the first communication device, and $B_2$ represents the operation bandwidth of the second communication device.

In one example, the operation bandwidth of the second communication device includes at least one of the following:

an operation bandwidth currently used by the second communication device; and a maximum operation bandwidth supported by the second communication device.

In one example, the apparatus further includes:

a first sending module, configured to send a second message frame. The second message frame includes a second information element that indicates the maximum operation bandwidth supported by the first communication device.

In one example, the second information element includes:
a second information element identifier for identifying the second information element;
a second length identifier for identifying a length of the second information element; and
a second operation bandwidth identifier for identifying the maximum operation bandwidth supported by the first communication device.

In one example, the first information element includes:
a first information element identifier for identifying the first information element;
a first length identifier for identifying a length of the first information element; and
a first operation bandwidth identifier for identifying the operation bandwidth currently used by the second communication device and/or the maximum operation bandwidth supported by the second communication device.

According to a fourth aspect of examples of the present disclosure, an apparatus for configuring a communication connection and is applied to a second communication device. The apparatus includes: a second sending module.

The second sending module is configured to send a first message frame. The first message frame includes: a first information element that indicates an operation bandwidth of the second communication device.

In one example, the second sending module includes:
a sending sub-module, configured to send the first message frame through a first connection with a first communication device.

The first connection is configured on a first BSS in N basic service sets (BSSs). The N basic service sets (BSSs) are established by the first communication device based on the operation bandwidth of the second communication device and a maximum operation bandwidth supported by the first communication device.

N is a positive integer.

In one example, the apparatus further includes:
a communication module, configured to: in response to determining that a load of the first BSS reaches a preset threshold, communicate with the first communication device through the first connection migrated to a second BSS in the N BSSs.

The second BSS is different from the first BSS.

In one example, a bandwidth of one of the BSSs is equal to a product of the operation bandwidth of the second communication device and $2^{(M-1)}$, and the product of the operation bandwidth of the second communication device and $2^{(M-1)}$ is smaller than or equal to the maximum operation bandwidth supported by the first communication device, where M is a positive integer larger than or equal to 1.

In one example, N is represented by the following expression:

$$N = \frac{B_{1max}}{2^{(M-1)}B_2}$$

where $B_{1\ max}$ represents the maximum operation bandwidth supported by the first communication device, and $B_2$ represents the operation bandwidth of the second communication device.

In one example, the operation bandwidth of the second communication device includes at least one of the following:
an operation bandwidth currently used by the second communication device; and
a maximum operation bandwidth supported by the second communication device.

In one example, the apparatus further includes:
a second receiving module, configured to receive a second message frame. The maximum operation bandwidth supported by the first communication device is determined according to a second information element included by the second message frame.

In one example, the second information element includes:
a second information element identifier for identifying the second information element;
a second length identifier for identifying a length of the second information element; and
a second operation bandwidth identifier for identifying the maximum operation bandwidth supported by the first communication device.

In one example, the first information element includes:
a first information element identifier for identifying the first information element;
a first length identifier for identifying a length of the first information element; and
a first operation bandwidth identifier for identifying the operation bandwidth currently used by the second communication device and/or the maximum operation bandwidth supported by the second communication device.

The examples of the present disclosure provide a method and apparatus for configuring a communication connection, and a communication device and a storage medium. The first communication device receives the first message frame, and the first message frame includes: the first information element that indicates the operation bandwidth of the second communication device. In this way, the second communication device provides a manner of explicitly indicating the operation bandwidth through the operation bandwidth of the second communication device indicated by the first information element in the message frame, the first communication device may directly determine the operation bandwidth of the second communication device according to the first information element included in the message frame, and no extra indication is needed for inquiring about the operation bandwidth of the second communication device, so the amount of information included in the message frame is increased, and a convenience degree in acquiring the operation bandwidth of the second communication device is improved. It should be understood that the foregoing general description and the following detailed description are used as examples and are explanatory merely, without any limitation to the examples of the present disclosure.

What is claimed is:

1. A method for configuring a communication connection, applied to a first communication device, and comprising:
obtaining an operation bandwidth of a second communication device connected to the first communication device;
establishing N basic service sets (BSSs), wherein a connection between the first communication device and the second communication device is configured on a first BSS in the N BSSs; N is a positive integer; and wherein the N BSSs are established based on the operation bandwidth of the second communication device and a maximum operation bandwidth supported by the first communication device; and wherein the method further comprises:
migrating the connection on the first BSS to a second BSS in the N BSSs, when determining that there are unbalanced loads among the BSSs according to load conditions of the BSSs and the unbalanced loads are caused by the first BSS, wherein N is larger than 1.

2. The method according to claim 1, wherein a bandwidth of one of the BSSs is equal to a product of the operation bandwidth of the second communication device and $2^{(M-1)}$, and the product of the operation bandwidth of the second communication device and $2^{(M-1)}$ is smaller than or equal to the maximum operation bandwidth supported by the first communication device, where M is a positive integer larger than or equal to 1.

3. The method according to claim 1, wherein N is represented by the following expression:

$$N = \frac{B_{1max}}{2^{(M-1)}B_2}$$

where $B_{1\ max}$ represents the maximum operation bandwidth supported by the first communication device, and $B_2$ represents the operation bandwidth of the second communication device.

4. The method according to claim 1, wherein the operation bandwidth of the second communication device comprises at least one of the following:
an operation bandwidth currently used by the second communication device; and
a maximum operation bandwidth supported by the second communication device.

5. The method according to claim 1, further comprising:
sending a second message frame, wherein the second message frame comprises a second information element that indicates the maximum operation bandwidth supported by the first communication device.

6. The method according to claim 5, wherein the second information element comprises:
a second information element identifier for identifying the second information element;
a second length identifier for identifying a length of the second information element; and
a second operation bandwidth identifier for identifying the maximum operation bandwidth supported by the first communication device.

7. The method according to claim 1, wherein obtaining the operation bandwidth of the second communication device connected to the first communication device comprises:
receiving a first message frame of the second communication device, wherein the first message frame indicates the operation bandwidth of the second communication device.

8. A method for configuring a communication connection, applied to a second communication device, and comprising:
sending an operation bandwidth of the second communication device to a first communication device;
wherein a connection between the first communication device and the second communication device is configured on a first BSS in an N basic service sets (BSSs); N is a positive integer; and wherein the N BSSs are established based on the operation bandwidth of the second communication device and a maximum operation bandwidth supported by the first communication device; and wherein the method further comprises:
communicating with the first communication device through a connection migrated to a second BSS, wherein the connection is migrated to the second BSS in the N BSSs when determining that there are unbalanced loads among the BSSs according to load conditions of the BSSs and the unbalanced loads are caused by the first BSS, wherein N is larger than 1.

9. The method according to claim 8, wherein a bandwidth of one of the BSSs is equal to a product of the operation bandwidth of the second communication device and $2^{(M-1)}$, and the product of the operation bandwidth of the second communication device and $2^{(M-1)}$ is smaller than or equal to the maximum operation bandwidth supported by the first communication device, where M is a positive integer larger than or equal to 1.

10. The method according to claim 8, wherein N is represented by the following expression:

$$N = \frac{B_{1max}}{2^{(M-1)}B_2}$$

where $B_{1\ max}$ represents the maximum operation bandwidth supported by the first communication device, and $B_2$ represents the operation bandwidth of the second communication device.

11. The method according to claim 8, wherein the operation bandwidth of the second communication device comprises at least one of the following:
an operation bandwidth currently used by the second communication device; and
a maximum operation bandwidth supported by the second communication device.

12. The method according to claim 8, further comprising:
receiving a second message frame, wherein the maximum operation bandwidth supported by the first communication device is determined according to a second information element comprised in the second message frame.

13. The method according to claim 12, wherein the second information element comprises:
a second information element identifier for identifying the second information element;
a second length identifier for identifying a length of the second information element; and
a second operation bandwidth identifier for identifying the maximum operation bandwidth supported by the first communication device.

14. A communication device, comprising a processor, a transceiver, a memory, and an executable program stored on the memory and executable by the processor, wherein the processor executes, when running the executable program, steps of the method for configuring the communication connection according to claim 8.

15. The method according to claim 8, wherein sending the operation bandwidth of the second communication device to the first communication device comprises:
sending a first message frame of the second communication device to the first communication device, wherein the first message frame indicates the operation bandwidth of the second communication device.

16. A communication device, comprising a processor, a transceiver, a memory and an executable program which is stored on the memory and can be run by the processor, wherein the processor is configured to:
- obtain an operation bandwidth of a second communication device connected to a first communication device;
- establish N basic service sets (BSSs), wherein a connection between the first communication device and the second communication device is configured on a first BSS in the N BSSs; N is a positive integer; and wherein the N BSSs are established based on the operation bandwidth of the second communication device and a maximum operation bandwidth supported by the first communication device; and wherein the processor is further configured to:

migrate the connection on the first BSS to a second BSS in the N BSSs, when determining that there are unbalanced loads among the BSSs according to load conditions of the BSSs and the unbalanced loads are caused by the first BSS, wherein N is larger than 1.

* * * * *